US011355987B2

(12) United States Patent
Gentz et al.

(10) Patent No.: US 11,355,987 B2
(45) Date of Patent: Jun. 7, 2022

(54) POLE TOOTH MODULE FOR AN ELECTRIC MACHINE, ACTIVE PART COMPRISING A POLE TOOTH MODULE, AND ELECTRIC MACHINE

(71) Applicant: Vitesco Technologies Germany GmbH, Hannover (DE)

(72) Inventors: Matthias Gentz, Berlin (DE); Nils Krone, Königs Wusterhausen (DE); Lennart Leopold, Berlin (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 57 days.

(21) Appl. No.: 16/654,751

(22) Filed: Oct. 16, 2019

(65) Prior Publication Data

US 2020/0052542 A1 Feb. 13, 2020

Related U.S. Application Data

(63) Continuation of application No. PCT/EP2018/059263, filed on Apr. 11, 2018.

(30) Foreign Application Priority Data

Apr. 19, 2017 (DE) ...................... 10 2017 206 597.4

(51) Int. Cl.
*H02K 3/52* (2006.01)
*H02K 3/34* (2006.01)
*H02K 3/50* (2006.01)

(52) U.S. Cl.
CPC .................. *H02K 3/52* (2013.01); *H02K 3/34* (2013.01); *H02K 3/345* (2013.01); *H02K 3/50* (2013.01);

(Continued)

(58) Field of Classification Search
CPC ............ H02K 3/34; H02K 3/345; H02K 3/50; H02K 3/52; H02K 2203/09; H02K 2203/12

(Continued)

(56) References Cited

U.S. PATENT DOCUMENTS 7,253,547 B2 8/2007 Shin et al.
8,183,728 B2 5/2012 Schaflein et al.
(Continued)

FOREIGN PATENT DOCUMENTS

CN 1677792 A 10/2005
CN 205385358 U 10/2005
(Continued)

OTHER PUBLICATIONS

Sakai et al., English Translation of WO 2013/080597 (Year: 2013).*
(Continued)

*Primary Examiner* — Rashad H Johnson

(57) ABSTRACT

A pole tooth module for an electric machine is provided. The pole tooth module includes a pole tooth with a pole shoe and a pole head, a coil arranged around a circumferential surface of the pole tooth between the pole shoe and the pole head, and an insulation body enclosing the pole tooth and designed to electrically insulate the pole tooth from the coil. To enclose the pole tooth, the insulation body has a central piece, a first frame element and a second frame element. The central piece is arranged between the coil and the circumferential surface and at least partially surrounds the circumferential surface of the pole tooth. The first frame element adjoins a side of the central piece, which side faces the pole head. The second frame element adjoins an opposite side of the central piece, which opposite side faces the pole shoe, and encloses the pole shoe.

12 Claims, 14 Drawing Sheets

(52) U.S. Cl.
CPC ..... *H02K 2203/09* (2013.01); *H02K 2203/12* (2013.01)

(58) Field of Classification Search
USPC .................. 310/49.13, 71, 216.001, 216.074
See application file for complete search history.

(56) References Cited

U.S. PATENT DOCUMENTS

| | | | |
|---|---|---|---|
| 9,306,437 | B2 | 4/2016 | Brandau et al. |
| 2007/0278875 | A1 | 12/2007 | Haga et al. |
| 2009/0256439 | A1 | 10/2009 | Inoue et al. |
| 2010/0264773 | A1* | 10/2010 | Hino ........................ H02K 3/34 310/198 |
| 2012/0007453 | A1* | 1/2012 | Leiber ...................... H02K 9/22 310/43 |
| 2012/0098363 | A1* | 4/2012 | Elser ....................... H02K 3/522 310/71 |
| 2012/0235524 | A1* | 9/2012 | Sasaki ..................... H02K 3/522 310/71 |
| 2012/0267979 | A1 | 10/2012 | Yoshida et al. |
| 2012/0286619 | A1* | 11/2012 | Tsuiki ..................... H02K 3/522 310/215 |
| 2012/0293024 | A1 | 11/2012 | Yokogawa et al. |
| 2013/0043743 | A1* | 2/2013 | Kim ......................... H02K 3/32 310/43 |
| 2014/0103777 | A1 | 4/2014 | Santos et al. |
| 2015/0061431 | A1* | 3/2015 | Egami ..................... H02K 3/522 310/71 |
| 2015/0137634 | A1 | 5/2015 | Kurita et al. |
| 2015/0270756 | A1 | 9/2015 | Foulsham et al. |
| 2018/0287447 | A1* | 10/2018 | Kitamura ............... H02K 15/10 |
| 2019/0074735 | A1* | 3/2019 | Shono ....................... H02K 1/18 |

FOREIGN PATENT DOCUMENTS

| | | |
|---|---|---|
| CN | 103688445 A | 3/2014 |
| CN | 205385359 U | 7/2016 |
| EP | 1583201 A2 | 10/2005 |
| EP | 2763290 A2 | 8/2014 |
| JP | 2000069724 A | 3/2000 |
| JP | 200827870 | 10/2007 |
| JP | 2007259523 A | 10/2007 |
| WO | 2009027381 A1 | 3/2009 |
| WO | 2013080597 A1 | 6/2013 |

OTHER PUBLICATIONS

International Search Report and Written Opinion dated Jul. 2, 2018 from corresponding International Patent Application No. PCT/EP2018/059263.

German Office Action dated Jan. 1, 2018 for corresponding German Patent Application No. 10 2017 206 597.4.

* cited by examiner

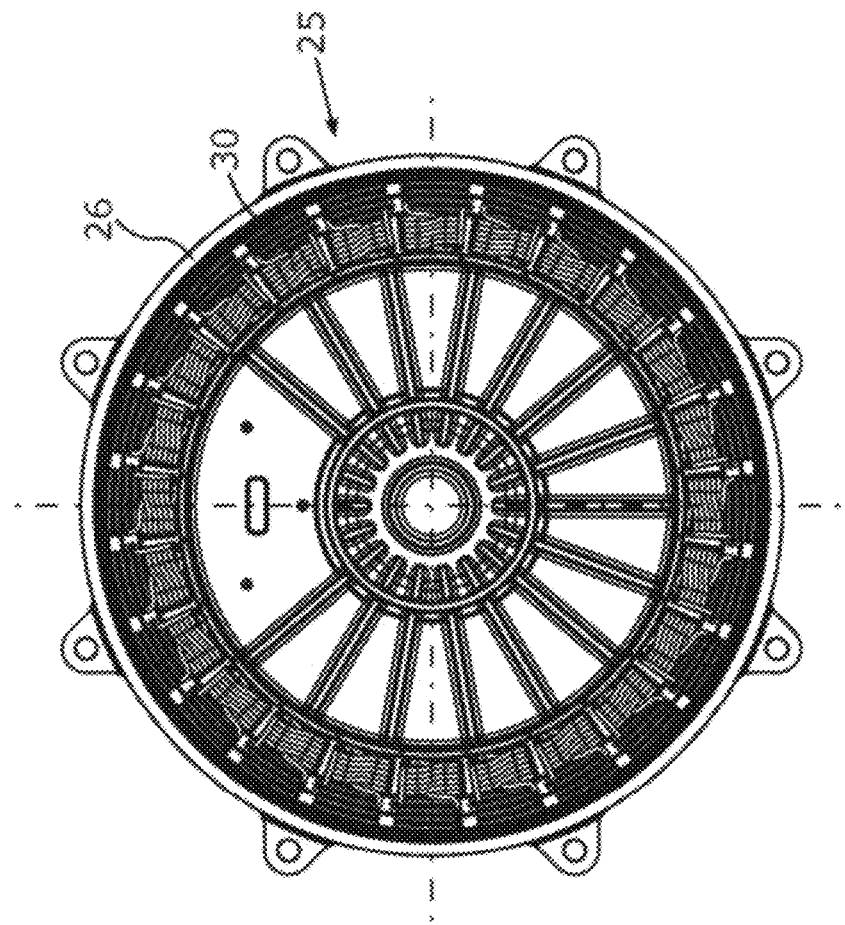
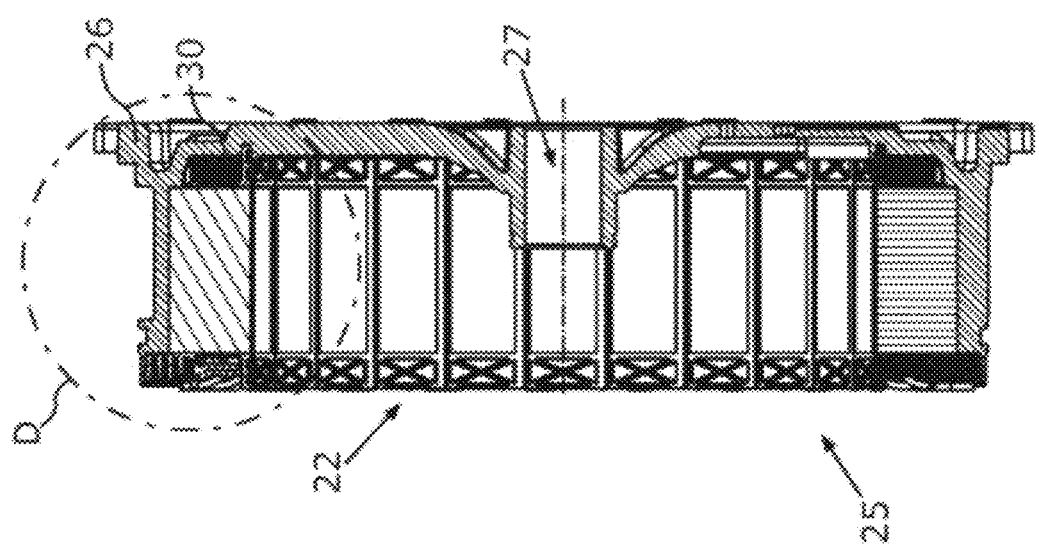
Fig.15
Fig.14

POLE TOOTH MODULE FOR AN ELECTRIC MACHINE, ACTIVE PART COMPRISING A POLE TOOTH MODULE, AND ELECTRIC MACHINE

CROSS-REFERENCE TO RELATED APPLICATIONS

This application claims the benefit of PCT Application PCT/EP2018/059263, filed Apr. 11, 2018, which claims priority to German Application DE 10 2017 206 597.4 filed Apr. 19, 2017. The disclosures of the above applications are incorporated herein by reference.

TECHNICAL FIELD

The disclosure relates to a pole tooth module for an electric machine. The pole tooth module includes a pole tooth with a pole head and a pole shoe. Furthermore, the pole tooth module has a coil arranged around a circumferential surface of the pole tooth between the pole head and the pole shoe. The disclosure further relates to an active part that includes a pole tooth module, and also to an electric machine that includes an active part.

BACKGROUND

In electric machines, such as electric motors for example, it is necessary to electrically insulate current-carrying components, such as coils for example. Various possible ways of electrically insulating current-carrying components of electric machines are known from the general prior art.

One possible way of electrically insulating the coils is the use of insulation paper. The insulation paper is inserted, as slot insulation, into slots of a laminated core of the stator or rotor, the coils being laid in said slots. The disadvantage of the insulation paper as slot insulation is that the level of complexity when fitting the insulation of the electric machine is particularly high. The insulation paper has to be folded and inserted into the slot for each slot of the laminated core of the stator or rotor of the electric machine.

A further possible way of electrically insulating the coils is the use of coil formers composed of plastic. A coil former is a rectangular or cylindrical pipe section with or without lateral flanges, onto which pipe section a coil, for example composed of wire, can be wound.

If, during further fitting, the coils which are electrically insulated with insulation paper or a plastic body are impregnated, drizzled or encapsulated, increased expenditure on sealing off the encapsulation mold or subsequent processing can be expected in order to ensure the electrical insulation by the encapsulation compound.

SUMMARY

The disclosure is based on the object of improving the electrical insulation and the fitting thereof for an electric machine.

One aspect of the disclosure provides a pole tooth module for an electric machine. The pole tooth module has a pole tooth with a pole head and a pole shoe. The pole tooth may have a pole shoe, a pole core and a pole head, where the pole core is arranged between the pole head or pole tooth head and the pole shoe. The pole tooth may include a plurality of individual laminations which together form a laminated core. In other words, the pole tooth may be designed as a laminated core with a plurality of individual laminations. In order to form the laminated core, the individual laminations may be stacked one on the other in a stacking direction. The pole tooth may be a single pole tooth.

Implementations of the disclosure may include one or more of the following optional features. In some implementations, the pole tooth module further has a coil which is arranged around a circumferential surface of the pole tooth between the pole head and the pole shoe. In other words, the coil is wound around the circumferential surface of the pole tooth, for example, around a central region of the pole tooth between the pole head and the pole shoe. The meaning of circumferential surface of the pole tooth is, for example, a lateral surface of the pole tooth between the pole head and the pole shoe. The "coil" may be an electrically conductive wire which is wound around the circumferential surface of the pole tooth.

In order to electrically insulate the coil from the pole tooth, the pole tooth module has an insulation body which encompasses the pole tooth and is designed to electrically insulate the pole tooth from the coil which is arranged around the pole tooth. In other words, the insulation body is designed to form a sleeve around the pole tooth, which sleeve at least partially, that is to say entirely or partially, surrounds or encloses or envelops the pole tooth. For the purpose of encompassing the pole tooth, the insulation body has a central piece, a first frame element and a second frame element. The insulation body may be of one-part or one-piece design. The insulation body may be formed from an injection-molding compound, for example plastic. For the purpose of enclosing the pole tooth by the insulation body or for the purpose of forming the insulation body, plastic, from which the insulation body can be formed, may be injection-molded around the pole tooth. In other words, the pole tooth may be encapsulated by injection molding with plastic so as to form the insulation body. As an alternative, the insulation body may also be of two-part design, that is to say can be composed of two parts. For the purpose of enclosing the pole tooth by the insulation body, the insulation body may be placed onto the pole tooth. In other words, the insulation body may be positioned around the pole tooth. For example, the insulation body may include two insulation body halves, of which one half is respectively associated with a region of the pole tooth, such as a half of the pole tooth.

The central piece of the insulation body is arranged between the coil and the circumferential surface and at least partially surrounds the circumferential surface of the pole tooth. The coil may therefore be wound around the central piece. The first frame element adjoins a side of the central piece, which side faces the pole head. The first frame element preferably rests on the pole head. The pole head may be free and not enveloped by the insulation body. The second frame element adjoins an opposite side of the central piece, which opposite side faces the pole shoe, and encloses the pole shoe. In other words, the second frame element can be designed to border or to frame the pole shoe. In other words, the second frame element can form a holding means for the pole shoe. Owing to the central piece and the two frame elements—first frame element and second frame element—, the insulation body may be designed in the manner of a coil former. Depending on the shape of the pole tooth, the central piece is preferably designed as a rectangular or cylindrical pipe section. In an insulation body which is designed in accordance with a coil former, the two frame elements preferably form lateral flanges.

Owing to the insulation body, electrical insulation of the coil which is wound around the pole tooth can be ensured in a particularly simple and reliable manner. In addition, the insulation body may be used for mechanically fixing the coil.

In some implementations, the central piece has a plurality of openings which are arranged at predetermined distances in relation to one another in a circumferential direction around the circumferential surface of the pole tooth in the central piece. The meaning of "openings" may be holes or slots. The coil, which is arranged around the central piece, and the pole tooth are thermally operatively connected to one another through the openings, for example, with the aid of an encapsulation compound or filling in the openings, as a result of which good dissipation of heat, for example, via a housing of the electric machine to an area surrounding the electric machine, is possible.

In some examples, the first frame element and/or the second frame element have/has at least two outer edges which extend in a main direction of extent of the pole tooth, where a first outer edge of the at least two outer edges has a receiving profile which extends along the first outer edge. A second outer edge which is situated opposite the first outer edge has a shape which corresponds to the receiving profile of the first outer edge. For example, the first outer edge may have, as a receiving profile, a groove, a U-shaped profile, an angled profile or an L-shaped profile. The meaning of "groove" may be a recess or channel. The receiving profile may extend entirely along the first outer edge. Since the second outer edge has a shape or profile which corresponds to the first outer edge, the second outer edge can be rounded or have a profile which is matched to the groove or an angled profile or an L-shaped profile. Owing to the outer edges which correspond to one another, the pole tooth modules may be put together or joined to one another so as to form a seal in a particularly simple and reliable manner.

The first frame element and/or the second frame element may be of rectangular design. In this case, the first frame element and/or the second frame element have four outer edges, of which the first outer edge and the second outer edge extend in the main direction of extent of the pole tooth. The two other outer edges—the third outer edge and the fourth outer edge—extend perpendicularly in relation to the main direction of extent of the pole tooth. The four outer edges together may form the rectangular shape or the rectangular profile of the first frame element and/or second frame element. For the purpose of forming the first frame element and/or the second frame element, the first frame element and/or second frame element have/has four inner edges, of which two extend parallel in relation to the first outer edge and in relation to the second outer edge in the main direction of extent of the pole tooth. The two other inner edges—third inner edge and fourth inner edge— extend parallel in relation to the third outer edge and the fourth outer edge perpendicularly in relation to the main direction of extent. The length of the inner edges of the first frame element and/or of the second frame element may be matched to the circumferential surface of the pole tooth, for example, to the circumferential surface of the pole tooth in the region of the central piece.

In some examples, the insulation body further includes a carrier element which is arranged on the first frame element. The carrier element may be arranged on an outer edge of the first frame element. Since the first frame element may be of rectangular design, the carrier element is arranged on one of the four outer edges of the first frame element. The carrier element is designed to hold at least one switching ring element of the electric machine. In addition, the carrier element has at least one receiving region in which the at least one switching ring element is arranged or received. The carrier element receives the at least one switching ring element, for example, at least in regions. In other words, the carrier element may be designed as a switching ring carrier. The carrier element may form a holder for the switching ring element. The receiving region may have a U-shaped profile. The switching ring element may be, for example, a busbar. The switching ring element may be designed for electrically connecting the coil. The carrier element may be arranged on the first frame element in such a way that the carrier element, for example, a rear side of the carrier element, extends parallel in relation to a side surface of the pole head, for examples, perpendicularly in relation to the main direction of extent of the pole tooth.

In this way, the insulation body benefits from a plurality of functions. Firstly, current-carrying components are electrically insulated from one another and, secondly, components which are to be mechanically fastened, for example the switching ring element, are held. The carrier element may have a plurality of receiving regions, for example, a plurality of U-shaped profiles which are arranged beside one another, in each of which a switching ring element is arranged. The integration of the carrier element as part of the insulation body has the advantage that the physical size of the pole tooth module is reduced and therefore the installation space requirement or the utilization of the installation space in the electric machine is improved.

The disclosure also includes an active part for an electric machine that includes a pole tooth module. The active part may be designed as a rotor or stator. The active part may have a plurality of pole tooth modules. In some examples, the active part has a total of 24 pole tooth modules.

In some implementations, the active part has a plurality of pole tooth modules. The respective pole tooth modules may be designed like the pole tooth module described above. In this case, the plurality of pole tooth modules are arranged in a ring in the circumferential direction of the active part in such a way that the first frame element of one pole tooth module adjoins the first frame element of the pole tooth module which is adjacent in the circumferential direction, and the second frame element of the pole tooth module adjoins the second frame element of the pole tooth module which is adjacent in the circumferential direction. In other words, the plurality of pole tooth modules may be arranged in a circle. The pole teeth of the respective pole tooth module may further be designed in such a way that the pole heads adjoin one another when the pole tooth modules are arranged beside one another, and therefore form an, for example, inherently, closed laminated core of the active part. The pole tooth modules may further be arranged beside one another in such a way that the carrier elements are arranged beside one another in the circumferential direction.

The pole tooth modules are advantageously arranged one beside one another in such a way that the respective outer edges of the first frame elements of adjacent pole tooth modules and/or the respective outer edges of the second frame elements of adjacent pole tooth modules interengage by way of the mutually corresponding shape or profiles. In other words, the pole tooth modules, for example, the frame elements—first frame element and second frame element—, are inserted one into the other for the purpose of forming the ring. When the pole tooth modules are arranged on or connected to one another, the second outer edge of one pole tooth module may be placed into the first outer edge of a pole tooth module which is adjacent in the circumferential direction. An axial sealing contour may be formed between the pole tooth modules in the region of the outer edges of the respective pole tooth modules due to the mutually corresponding profiles of the outer edges of the frame elements—first frame element and second frame element—of the pole tooth modules which are arranged beside one another.

In some examples, the respective pole tooth modules are designed in such a way that the outer edges of the first frame element and/or of the second frame element and/or of the carrier element of adjacent pole tooth modules are in contact.

As an alternative, in some examples, the respective pole tooth modules are designed in such a way that only the outer edges of the second frame elements are in contact or placed one into the other and for a gap to be formed between the outer edges of the first frame elements and/or of the carrier elements of adjacent pole tooth modules, for example, in the main direction of extension. In other words, the outer edges of the pole tooth modules, which are arranged in the ring, of the second frame elements are in contact and the outer edges of the first frame elements and/or of the carrier elements are not in contact. For example, the outer edges of the respective insulation body of the pole tooth segments which are arranged parallel in relation to one another in the main direction of extension in the ring are meant.

The disclosure also includes an electric machine that includes an active part according to the disclosure. The electric machine may be designed as an electric motor.

In some implementations, the electric machine has a housing, where the housing surrounds the active part in such a way that an inner side of the housing adjoins the second frame element. In other words, the second frame element is coupled to the housing. The housing may further include a circumferential groove on the inner side, the second frame element being received in the circumferential groove at least in regions. An outer edge of the second frame element, which outer edge extends perpendicularly in relation to the main direction of extension of the pole tooth, engages into the circumferential groove. Since the second frame element is received in the groove, the housing is closed off in a circumferential manner, so as to form a seal, in the region of the groove. In this case, the housing may adjoin the second frame element in such a way that, on a side of the pole tooth that extends perpendicularly in relation to the main direction of extension of the pole tooth, a chamber forms between the second frame elements, the central pieces of the pole tooth modules and the inner side of the housing.

The electric machine advantageously may have an encapsulation compound, where the active part is surrounded by the encapsulation compound at least in regions. The encapsulation compound may be formed, for example, from a plastic or resin or silicone. The encapsulation compound ensures that the pole tooth modules, for example, the pole teeth and/or the coil and/or the switching ring elements, are electrically insulated. The active part including the pole tooth modules may be encapsulated with the encapsulation compound. A direct thermal connection of the coils and/or of the switching ring elements to the pole tooth or the laminated core and also the housing is realized by the encapsulation compound through the openings in the insulation body. Particularly good removal of heat from the coils and/or from the busbars or from the switching ring elements takes place by way of the encapsulation compound. The encapsulation material or the encapsulation compound further serves to mechanically fix the carrier elements and/or the switching ring elements, so that no additional fixing is required.

The disclosure also includes a motor vehicle that includes the electric machine according to the disclosure. The motor vehicle may be designed as a car, for examples, as a passenger car.

The disclosure also includes examples of the active part according to the disclosure, of the electric machine according to the disclosure and of the motor vehicle, which developments have features as have already been described in connection with the developments of the pole tooth module according to the disclosure. For this reason, the corresponding examples of the active part according to the disclosure, of the electric machine according to the disclosure and of the motor vehicle according to the disclosure are not described again here.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 14 shows, in a sectional illustration, a schematic illustration of the electric machine including a plurality of pole tooth modules which are surrounded by a housing of the electric machine;

FIG. 15 shows, in a plan view, a schematic illustration of the electric machine including a plurality of pole tooth modules which are surrounded by the housing of the electric machine;

Like reference symbols in the various drawings indicate like elements.

DETAILED DESCRIPTION

The described components of the description below each constitute individual features of the disclosure which should be considered independently of one another and which in each case also develop the disclosure independently of one another and should therefore also be regarded as a constituent part of the disclosure individually or in a combination other than that shown. Furthermore, the examples and implementations described may also be supplemented by further features of the disclosure from among those which have already been described.

Figure 1:
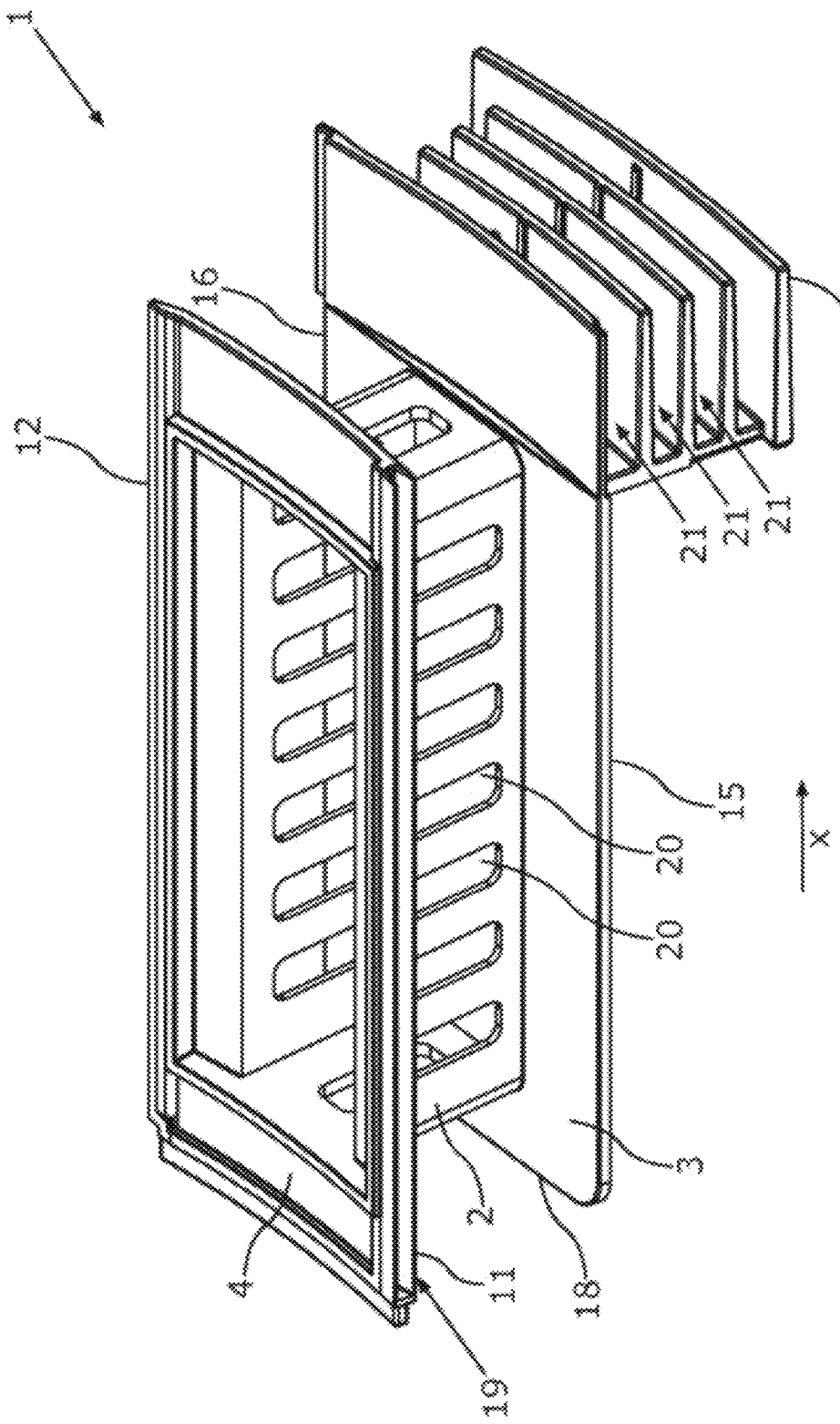
FIG. 1 shows, in a perspective view, a schematic illustration of an embodiment of an insulation body for a pole tooth of an active part of an electric machine.

FIG. 1 shows a schematic illustration of an insulation body 1 of a pole tooth module for an electric machine (not illustrated in FIG. 1) for electrically insulating a pole tooth (not illustrated in FIG. 1). The insulation body 1 is of one-part or two-part design. The insulation body 1 further has four elements or components. The insulation body 1 includes a central piece 2, a first frame element 3, a second frame element 4 and a carrier element 5. The insulation body 1 is formed in such a way that the central piece 2, the first frame element 3 and the second frame element 4 envelop the pole tooth.

Figure 2:
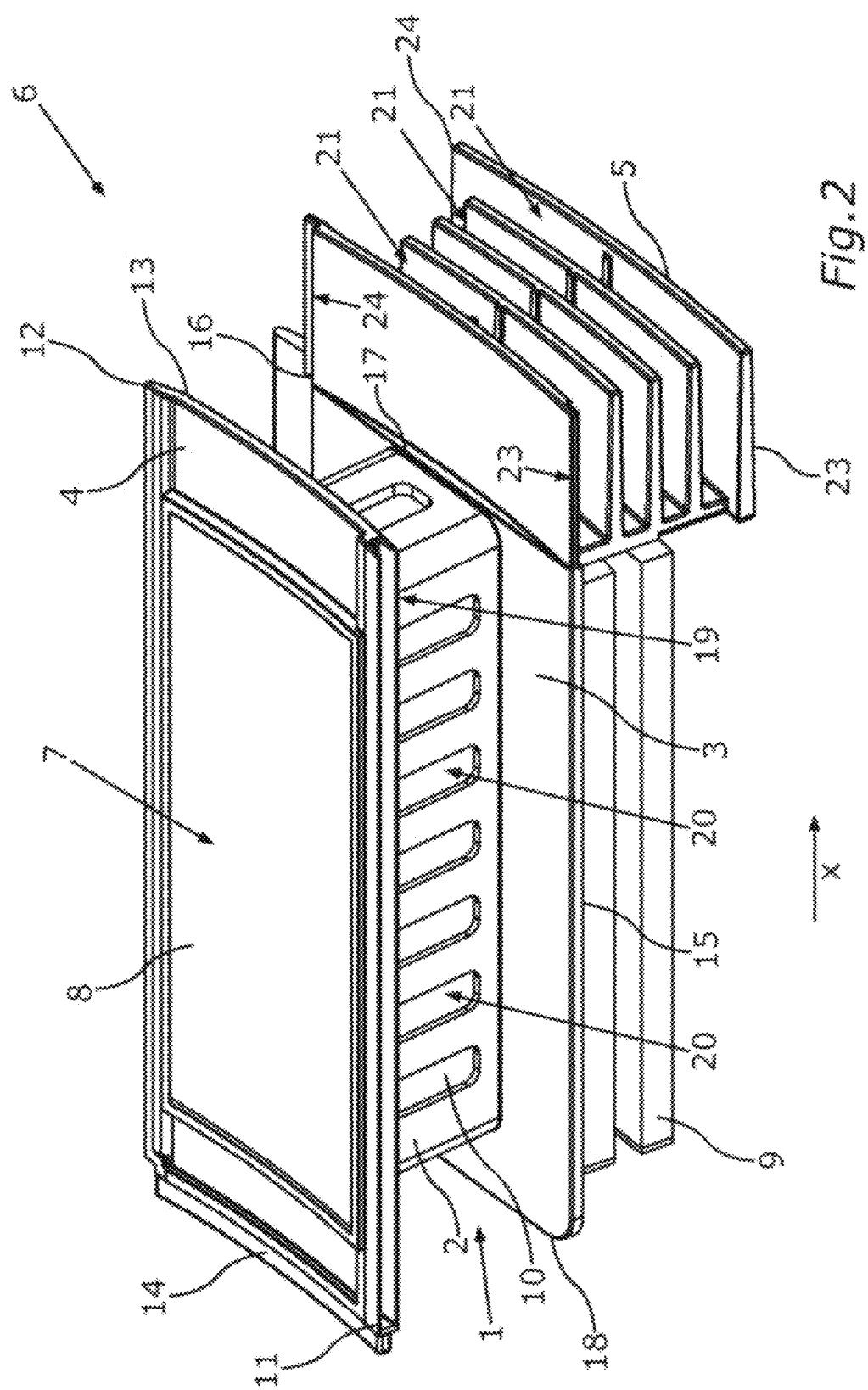
FIG. 2 shows, in a perspective view, a schematic illustration of a pole tooth module including the insulation body from FIG. 1 which envelops a pole tooth.

FIG. 2 shows, in a schematic illustration, the pole tooth module 6 with a pole tooth 7 which is enveloped by the insulation body 1. The pole tooth 7 has a pole shoe 8 and a pole head 9. In this case, the insulation body 1 encloses the pole tooth 7 in such a way that the central piece 2 of the insulation body 1 is arranged around a circumferential surface 10 of the pole tooth 7 between the pole shoe 8 and the pole head 9. In other words, the central piece 2 of the insulation body 1 envelops a pole core of the pole tooth 7. The meaning of circumferential surface 10 is a lateral surface of the pole tooth 7, which lateral surface extends between the pole head 9 and the pole shoe 8. The first frame element 3 of the insulation body 1 adjoins a side of the central piece 2 of the insulation body 1, which side faces the pole head 9. In this case, the first frame element 3 may rest on the pole head 9 or may be arranged at a predetermined distance in relation to the pole head 9. The second frame element 4 adjoins the central piece 2 of the insulation body 1 on an opposite side of the central piece 2 of the insulation body 1, which opposite side faces the pole shoe 8. In this case, the second frame element 4 encloses the pole shoe 8. A surface of the pole shoe 8, which surface is averted from the pole head 9, is free. This surface of the pole shoe 8 is not included or covered by the insulation body 1.

The first frame element 3 and the second frame element 4 have a rectangular shape. Therefore, the two frame elements 3, 4 each have four outer edges. Two of the four outer edges of the second frame element 4—a first outer edge 11 and a second outer edge 12—extend in a main direction of extension x of the pole tooth 7 in each case. The two other outer edges of the second frame element 4—a third outer edge 13 and a fourth outer edge 14—extend perpendicularly in relation to the main direction of extension x of the pole tooth 7. Two of the four outer edges of the first frame element 3—a first outer edge 15 and a second outer edge 16—extend in a main direction of extension x of the pole tooth 7 in each case. The two other outer edges of the first frame element—a third outer edge 17 and a fourth outer edge 18—extend perpendicularly in relation to the main direction of extension x of the pole tooth 7.

In the case of the second frame element 4, the first outer edge 11 has a receiving profile 19. In this example, the receiving profile 19 is designed as a groove. In this case, the receiving profile 19 extends at least partially, that is to say entirely or partially, along the first outer edge 11 of the second frame element 4. A second outer edge 12 of the second frame element 4, which second outer edge is situated opposite the first outer edge 11, has a shape which corresponds to the receiving profile 19 of the first outer edge 11. In other words, the shape of the second outer edge 12 of the second frame element 4 may correspond to the receiving profile 19, for examples, for the purpose of engaging into this receiving profile 19. For example, the second outer edge 12 may have a shape which is rounded, for examples, in cross section.

The central piece 2 of the insulation body 1 further has a plurality of openings 20 which are arranged at predetermined distances in relation to one another in the circumferential direction around the circumferential surface 10 of the pole tooth 7 in the central piece 2. The meaning of "openings" is, for example, holes or apertures. The openings 20 have a substantially rectangular shape. The openings 20 further have a greater extension perpendicularly in relation to the main direction of extension x than in the main direction of extension x. In other words, the openings 20 may be of rectangular or slot-like design. As an alternative, the openings 20 may also be of round design or have another geometry.

The insulation body 1 may further have the carrier element 5 which is arranged on the first frame element 3. In this case, the carrier element 5 can be arranged on the first frame element 3 in such a way that the carrier element 5 extends along a side of the pole head 9, which side extends perpendicularly in relation to the main direction of extension x of the pole tooth 7. Since the first frame element 3 is of rectangular design, the carrier element 5 is arranged on one of the four outer edges, in this case on the third outer edge 17, of the first frame element 3.

The carrier element 5 receives at least one switching ring element (not shown in FIG. 2) which is designed, for example, as a busbar. In other words, the carrier element 5 may be designed as a switching ring carrier. To this end, the carrier element 5 has, as can be gathered from FIG. 2, a receiving region 21. The receiving region 21 has a U-shaped profile. The carrier element 5 may be designed to receive a plurality of, for example, four, switching ring elements. To this end, the carrier element 5 can have a total of four receiving regions 21 which are arranged beside one another perpendicularly in relation to the main direction of extension x of the pole tooth 7 and which have, for example, a U-shaped profile.

Figure 3:
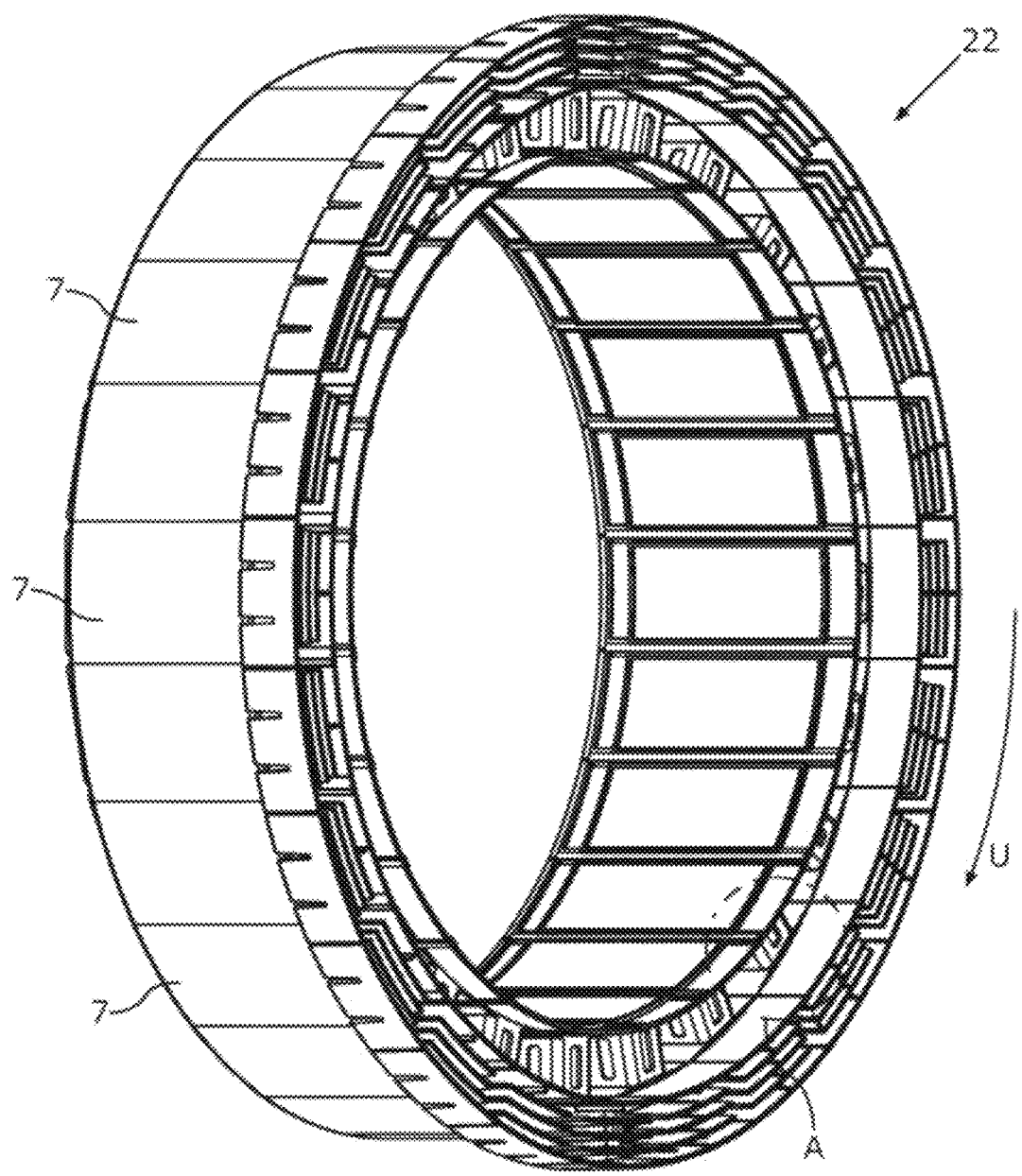
FIG. 3 shows, in a perspective view, a schematic illustration of an active part of the electric machine including a plurality of pole tooth modules which are arranged to form a ring.

FIG. 3 shows an active part 22 of the electric machine (not illustrated in FIG. 3). The active part 22 includes a plurality of pole tooth modules 6 which are arranged beside one another. The pole tooth modules 6 are each designed analogously to the pole tooth module 6 described in FIG. 2. The pole tooth modules 6 are arranged adjoining one another in a circumferential direction u of the active part 22 around a rotation axis, not illustrated. In this case, the rotation axis coincides with the main direction of extension x of the pole tooth 7. The pole tooth modules 6 together form a ring. The active part 22 is designed as a stator of the electric machine. In this case, the pole tooth modules 6 are arranged beside one another in such a way that the pole teeth 7 or pole heads 9 adjoin one another and an inherently closed laminated core of the active part 22, for example, of the stator, is formed in this way.

In this case, the plurality of pole tooth modules 6 are arranged in the ring in the circumferential direction u of the active part 22 in such a way that the first frame element 3 of one pole tooth module 6 adjoins the first frame element 3 of the pole tooth module 6 which is adjacent in the circumferential direction u, and the second frame element 4 of the pole tooth module 6 adjoins the second frame element 4 of the pole tooth module 6 which is adjacent in the circumferential direction u. As an alternative, the plurality of pole tooth modules 6 may be arranged in the circumferential direction u in such a way or for the pole tooth modules to be designed in such a way that a gap or a spacing is formed between adjacent first frame elements 3. In other words, the plurality of pole tooth modules 6 can be arranged in a ring at a predetermined distance in relation to one another in the circumferential direction u. In order for a gap to form between the adjacent first frame elements 3, the second frame elements 4 may be of wider design than the first frame elements 3 perpendicularly in relation to the main direction of extension x. That is to say, the width of the second frame elements 4 may be greater than that of the first frame elements 3 perpendicularly in relation to the main direction of extension x.

The pole tooth modules 6 are further arranged beside one another in such a way that the carrier elements 5 of the respective pole tooth modules 6 are arranged adjoining one another in the circumferential direction u. As an alternative, provision can be made for the carrier elements 5 of the respective pole tooth modules 6 to be arranged at a predetermined distance in relation to one another in the circumferential direction u. In other words, a spacing or a gap can be formed between adjacent carrier elements. In this case, the carrier elements 5 are arranged or designed in such a way that they adjoin an end side of the laminated core perpendicularly in relation to the main direction of extension x.

Forming a gap between adjacent first frame elements and/or carrier elements serves for tolerance compensation of the electric machine and/or for passage for an encapsulation material.

Figure 4:
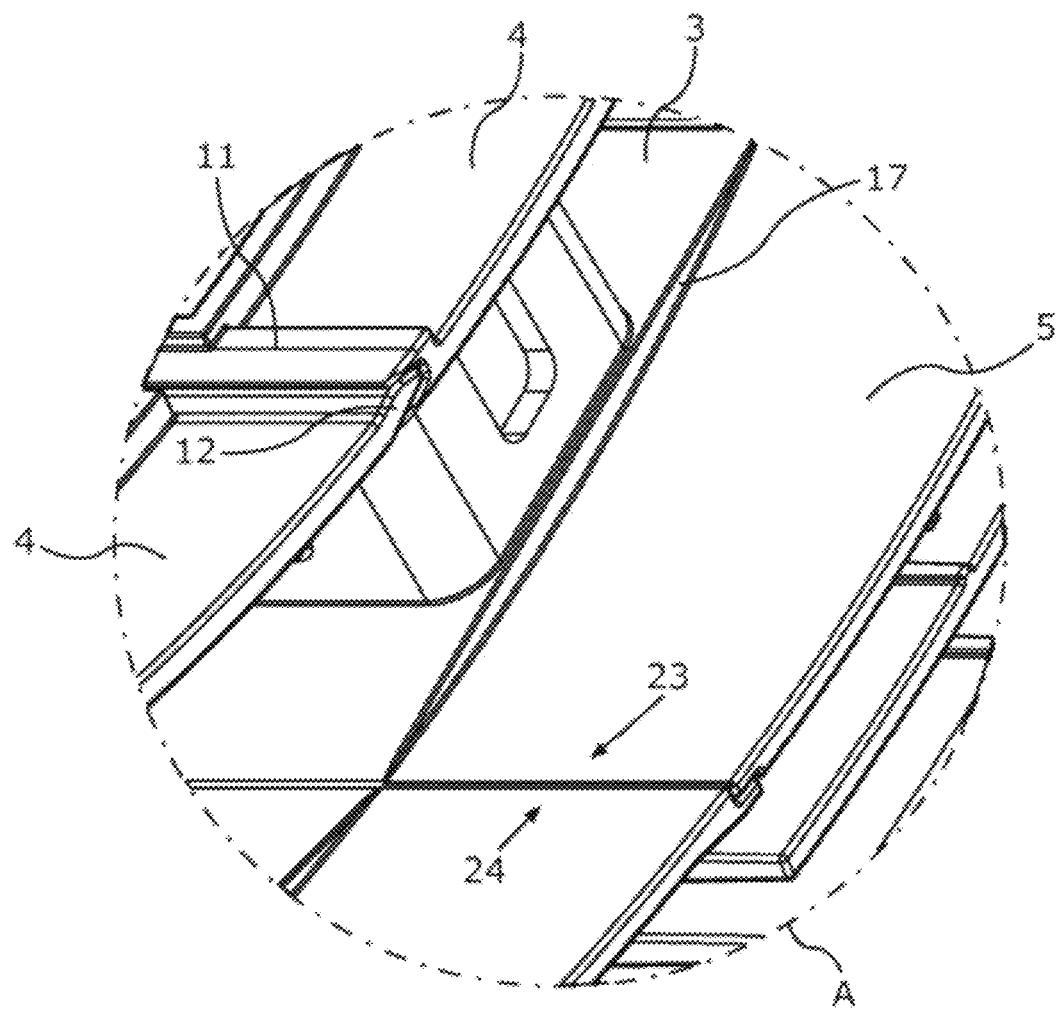
FIG. 4 shows a schematic illustration of a detail of the active part from FIG. 3.

FIG. 4 illustrates, on an enlarged scale, an emphasized detail A of the active part 22, which detail is framed by a circle in FIG. 3. The enlarged illustration shows how the second outer edge 12 of the second frame element 4, which has a rounded shape, engages into the receiving profile 19 of the second frame element 4 which is adjacent in the circumferential direction u. Due to the receiving profile 19 of an outer edge of the second frame element 4 and also due to the corresponding shape of the opposite outer edge, the pole tooth modules 6 or the insulation bodies 1 of the respective pole tooth modules 6 can be clipped or placed one into the other so as to form a seal.

It can further be gathered from FIG. 4 that the carrier element 5 likewise has a receiving profile on at least two outer edges 23, 24 which extend in the main direction of extension x of the pole tooth 7 and lengthen the outer edges 15, 16 of the first frame element 3 in the main direction of extension x of the pole tooth 7. The profiles of the respective outer edges 23, 24 of the carrier element 5 have a corresponding shape. As can be gathered from FIG. 2 and FIG. 4, the shape of the two outer edges 23, 24 is designed as an angled profile or as an L-shaped profile. The carrier elements 5 directly adjoin one another or overlap, without being in contact, by way of the receiving profiles of the outer edges of the carrier element 5. Due to the corresponding shape of the opposite outer edges, the carrier elements 5 or the insulation bodies 1 of the respective pole tooth modules 6 can be clipped or placed one into the other so as to form a seal. The shape of the respective outer edges 23, 24 of the carrier element 5 may be matched to the shape of the outer edge of the first frame element 3 that adjoins it in the main direction of extension x.

An axial sealing contour is formed between the pole tooth modules 6 in the region of the outer edges 11, 12, 23, 24 of the respective pole tooth modules 6 due to the mutually corresponding profiles of the outer edges of the frame elements 3, 4 and/or carrier elements 5 of the pole tooth modules 6 which are arranged beside one another.

Figure 5:
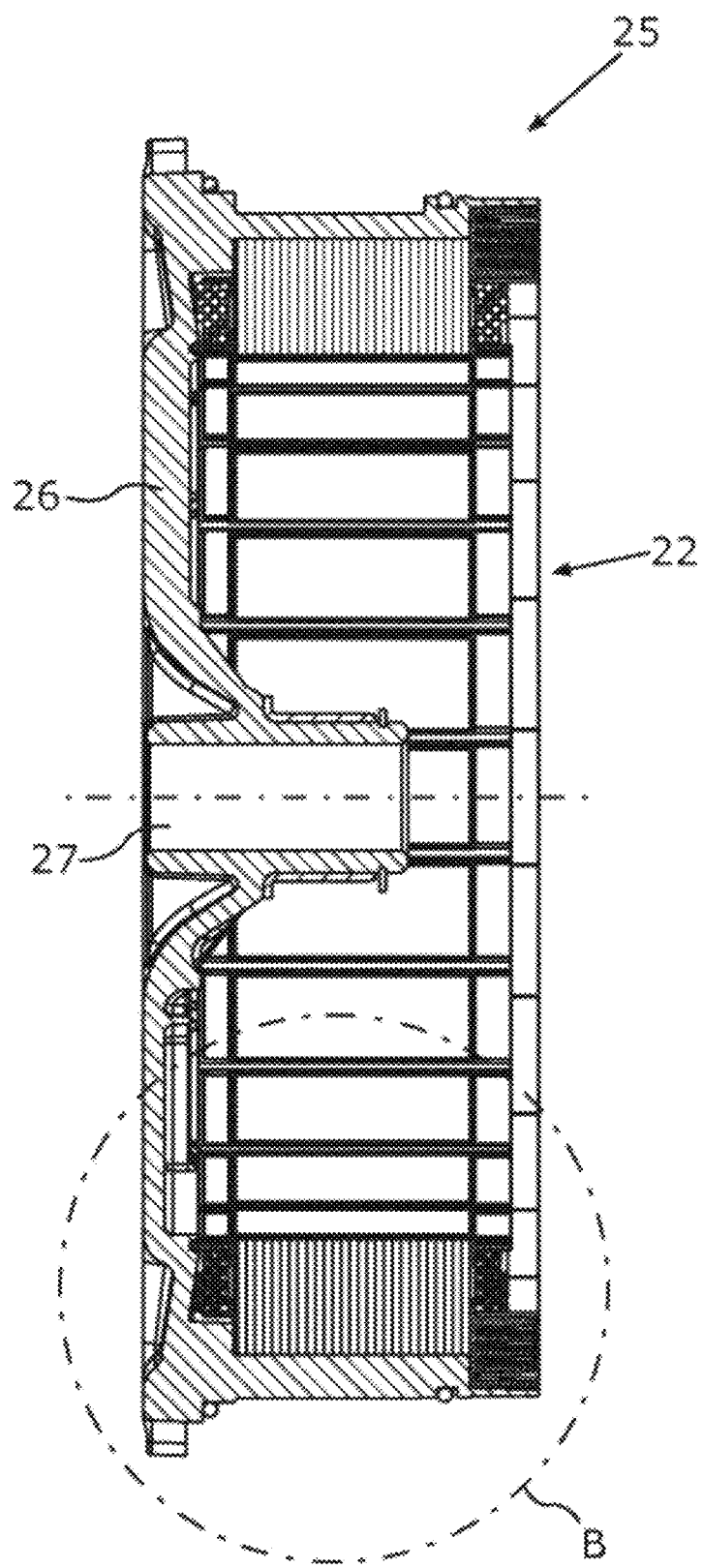
FIG. 5 shows, in a sectional illustration, a schematic illustration of the electric machine including a plurality of pole tooth modules which are surrounded by a housing of the electric machine.

FIG. 5 shows an electric machine 25 having an active part 22 and a housing 26. As can be gathered from FIG. 5, the housing 26 encompasses the active part 22. The housing 26 further has a passage opening 27 for receiving or leading-through a shaft, not illustrated in FIG. 5, of the electric machine 25. The active part 22 is fitted into the housing 26 with a press fit.

Figure 6:
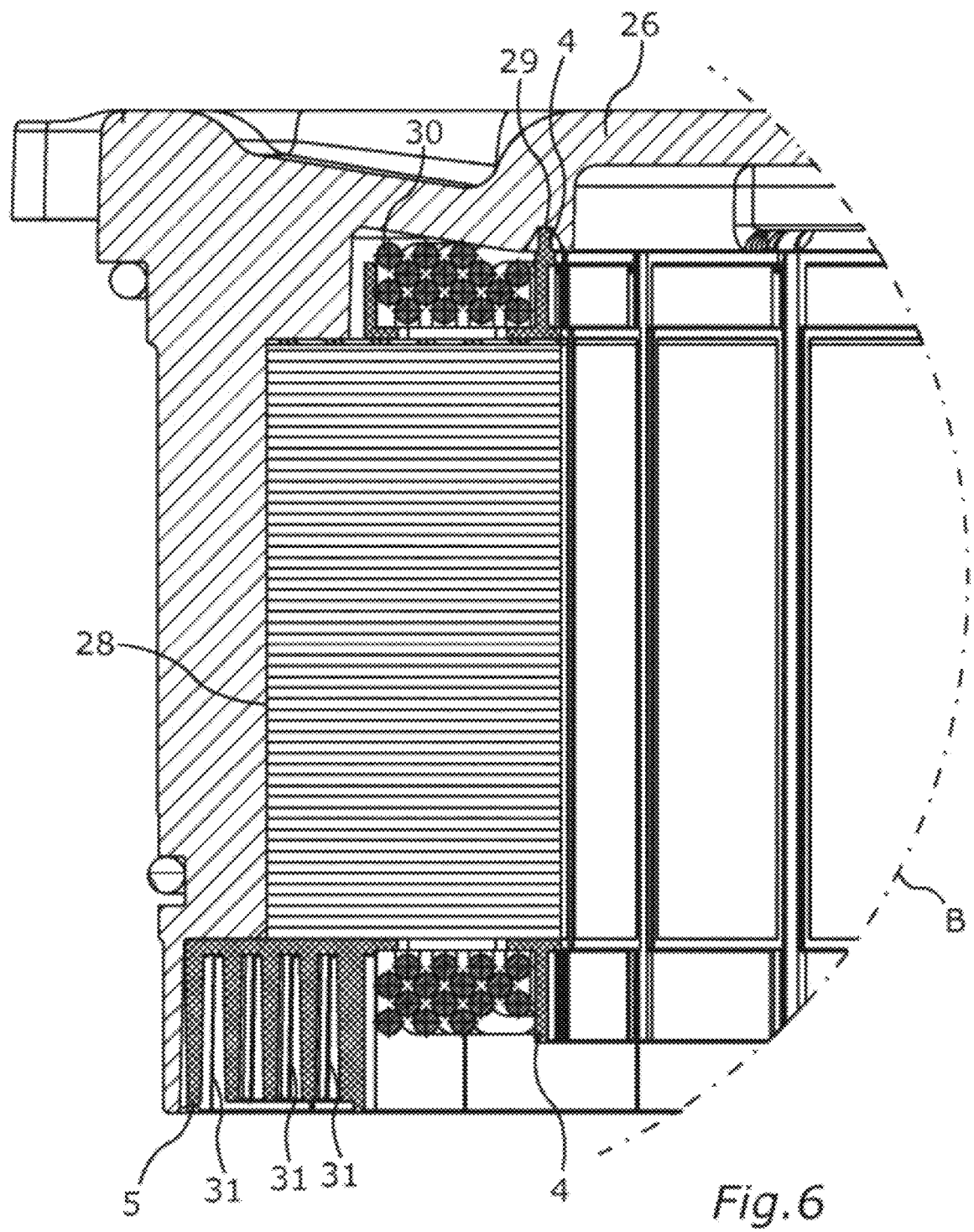
FIG. 6 shows a schematic illustration of a detail of the electric machine from FIG. 5.

FIG. 6 illustrates, on an enlarged scale, an emphasized detail B of the electric machine 25, which detail is framed by a circle in FIG. 5. The enlarged illustration shows how the active part 22, by way of its individual pole tooth modules 6, is enclosed into the housing 26. In this case, an inner surface 28 of the housing 26 bears directly against the pole tooth 7, for example, the pole shoe 8. Furthermore, a circumferential groove 29, in which the second frame element 4 is received in regions, is provided on the inner side 28 or inner surface of the housing 26. It is likewise clear from FIG. 6 that a coil 30 is wound around the central piece 2 of the insulation body 1.

Figure 7:
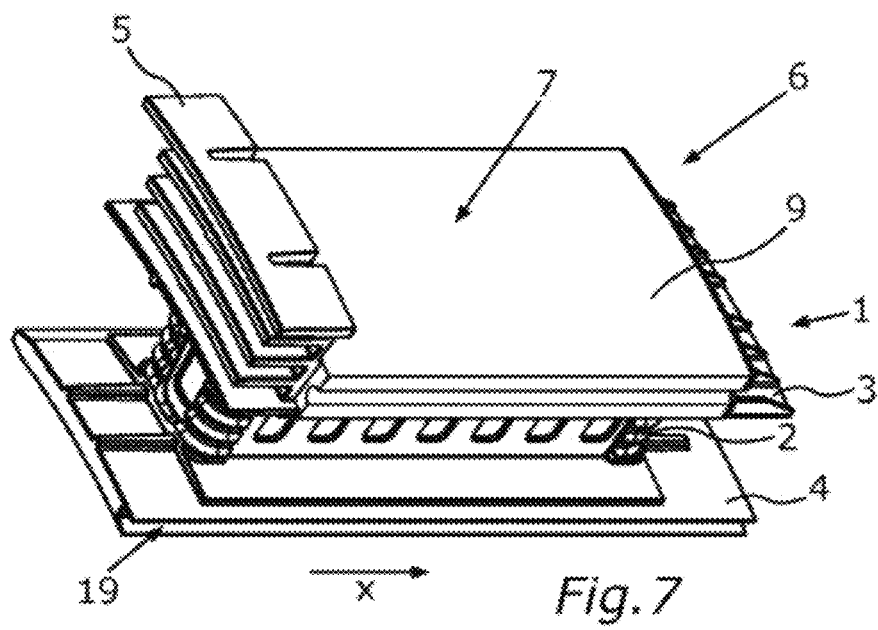
FIG. 7 shows, in a perspective view, a schematic illustration of a pole tooth module including a further embodiment of the insulation body which envelops a pole tooth.
Figure 8:
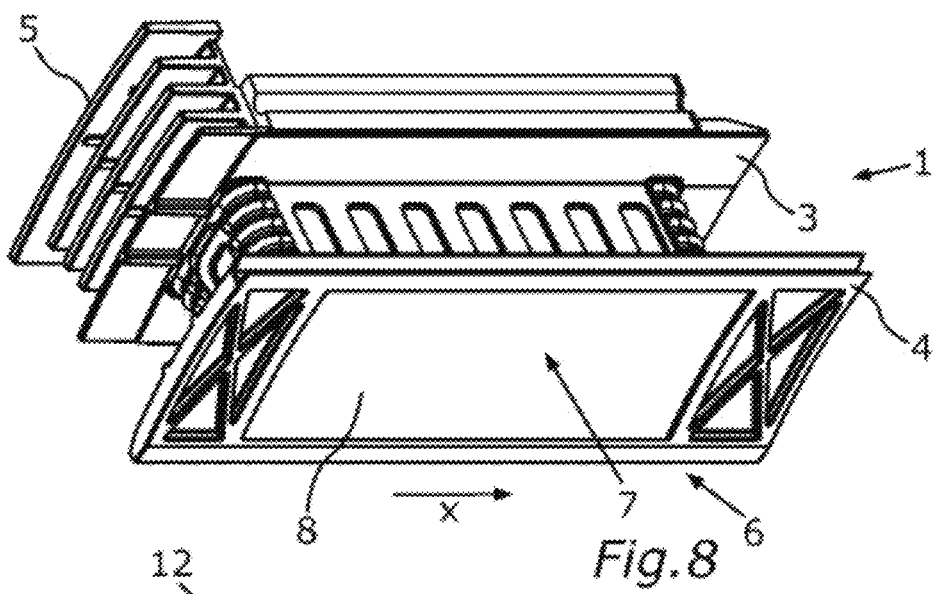
FIG. 8 shows, in a further perspective view, a schematic illustration of the pole tooth module from FIG. 7.
Figure 9:
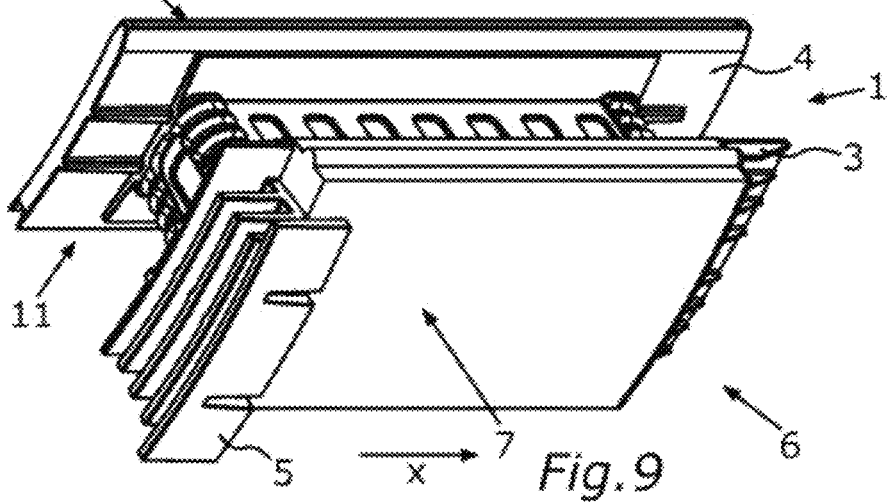
FIG. 9 shows, in a further perspective view, a schematic illustration of the pole tooth module from FIG. 7.
Figure 10:
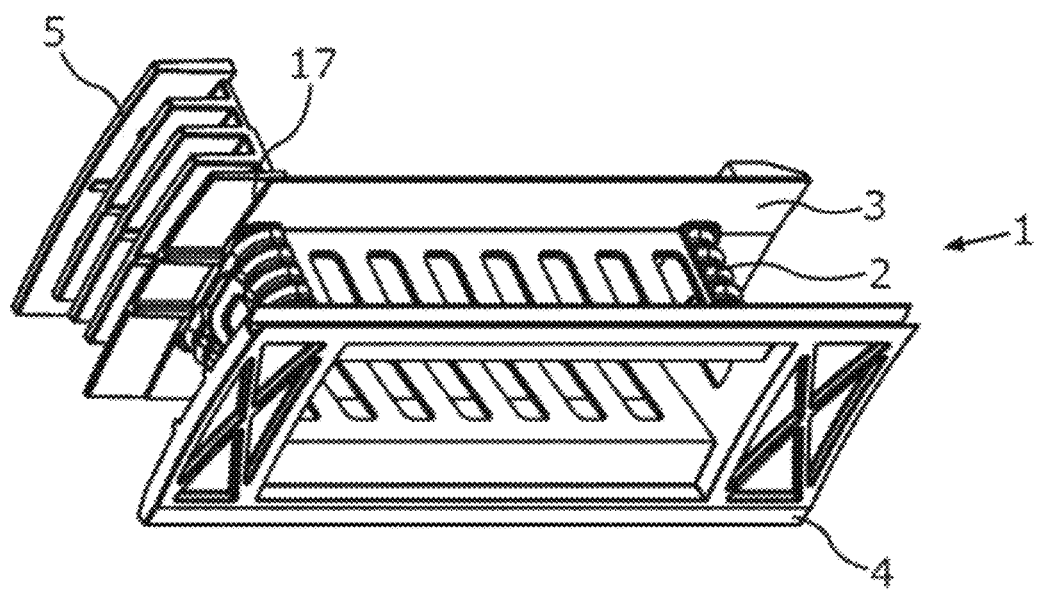
FIG. 10 shows, in a perspective view, a schematic illustration of the further embodiment of the insulation body.
Figure 11:
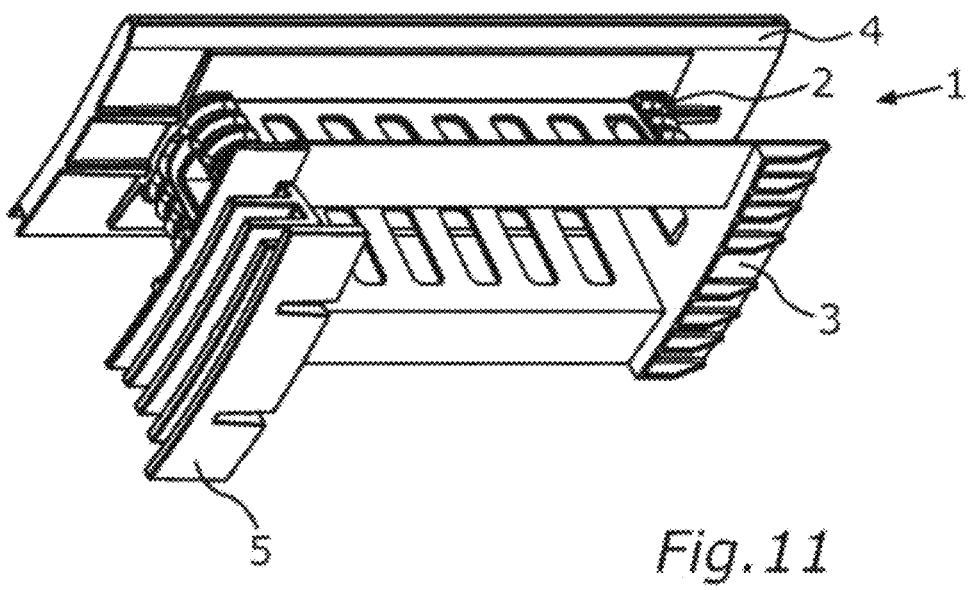
FIG. 11 shows, in a further perspective view, a schematic illustration of the further embodiment of the insulation body.

FIG. 7 to FIG. 9 show an alternative example of the pole tooth module 6, and FIG. 10 and FIG. 11 show an alternative example of the insulation body 1. Like the examples shown in FIG. 1 and FIG. 2, the examples of the insulation body 1 in FIGS. 7 to 11 are also designed to electrically insulate the pole tooth 7. To this end, the insulation body 1 has the central piece 2, the first frame element 3, the second frame element 4 and the carrier element 5. The second frame element 4 is designed like the second frame element 4 described in FIG. 1 and FIG. 2. Similarly, the central piece 2 is designed like the central piece 2 described in FIG. 1 and FIG. 2. The central piece 2 shown in FIGS. 7 to 9 additionally has channels in the region of the corners, which channels are designed to receive or to hold or to support wires of the coil 30 which are wound around the central piece 2 of the insulation body 1.

The first frame element 3 is designed like the first frame element 3 described in FIG. 1 and FIG. 2. The first frame element 3 of the insulation body 1 adjoins a side of the central piece 2 of the insulation body 1, which side faces the pole head 9. In this case, the first frame element 3 can rest on the pole head 9 or can be arranged at a predetermined distance in relation to the pole head 9. The insulation body 1 further has the carrier element 5 which is arranged on the first frame element 3. In this case, the carrier element 5 can be arranged on the first frame element 3 in such a way that the carrier element 5 extends along a side of the pole head 9, which side extends perpendicularly in relation to the main direction of extension x of the pole tooth 7. Since the first frame element 3 is of rectangular design, the carrier element 5 is arranged on one of the four outer edges, in this case on the third outer edge 17, of the first frame element 3 or rests on the first frame element 3, in regions, in the region of the third outer edge 17. In contrast to the first frame element, the carrier element 5, in regions, does not extend entirely along the side of the pole head 9, against which side the carrier element 5, for example, by way of a side, bears. The first frame element 3 has a projection on a side or end of the insulation body 1, which side or end is situated opposite the carrier element 5. Due to the projection and the carrier element 5, the pole head 9 is enclosed, at least in regions, on two mutually opposite sides which extend perpendicularly in relation to the main direction of extension x. The sides of the pole head 9 which extend in the main direction of extension x and the side which is averted from the pole shoe 7 are free or are not enclosed by the first frame element.

Figure 12:
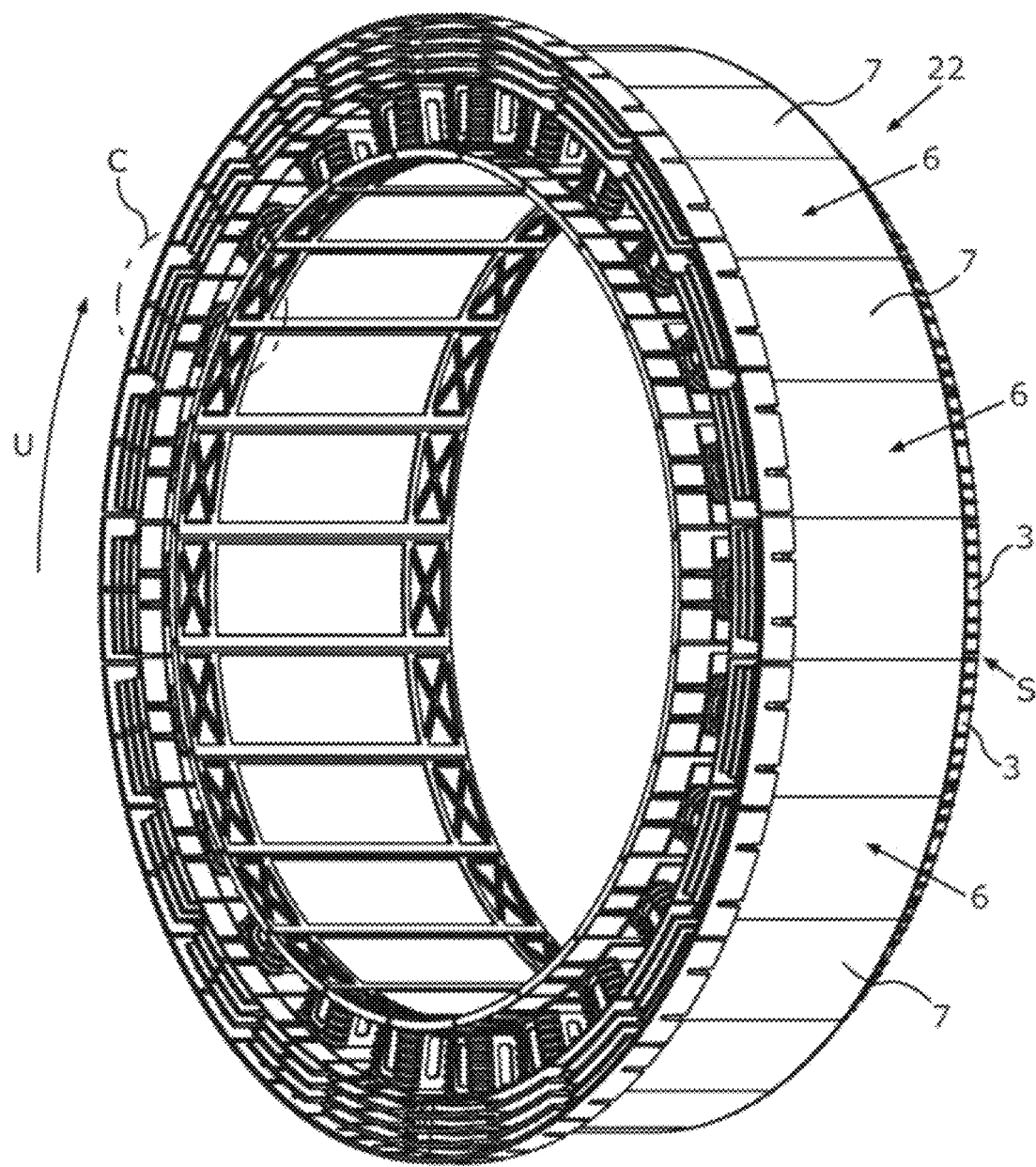
FIG. 12 shows, in a perspective view, a schematic illustration of a plurality of insulation bodies, which are arranged to form a ring, according to the further embodiment.

FIG. 12 shows the active part 22 of the electric machine (not illustrated in FIG. 12). In this case, the active part 22 is designed like the active part 22 shown in FIG. 3. The active part 22 includes a plurality of pole tooth modules 6 which are arranged beside one another. The pole tooth modules 6 are each designed analogously to the pole tooth module 6 described in FIG. 7 to FIG. 9. The pole tooth modules 6 are arranged adjoining one another in the circumferential direction u of the active part 22 around a rotation axis, not illustrated. In this case, the rotation axis coincides with the main direction of extension x of the pole tooth 7. The pole tooth modules 6 together form a ring. The active part 22 is designed as a stator of the electric machine. In this case, the pole tooth modules 6 are arranged beside one another in such a way that the pole teeth 7 or pole heads 9 adjoin one another and an inherently closed laminated core of the active part 22, for example, of the stator, is formed in this way.

In comparison to the active part 22 shown in FIG. 3, the plurality of pole tooth modules 6 are arranged or designed in the circumferential direction u in such a way that a gap S or a spacing is formed between the adjacent first frame elements 3 in this active part 22 shown in FIG. 12. For the purpose of forming the gap S, the width of the first frame element 3 is designed to be smaller or narrower than the width of the second frame element 4 of the respective insulation body 1 in the circumferential direction u. That is to say, the width of the second frame elements 4 may be greater than that of the first frame elements 3 in the circumferential direction u of the ring.

The pole tooth modules 6 are further arranged or designed beside one another in such a way that the carrier elements 5 of the respective pole tooth modules 6 are arranged beside one another in the circumferential direction u. In comparison to the active part 22 shown in FIG. 3, the carrier elements 5 of the respective pole tooth modules 6 are arranged at a predetermined distance in relation to one another in the circumferential direction u in this active part 22 shown in FIG. 12. The width of the carrier elements 5 in the circumferential direction u is configured in such a way that a spacing or a gap is formed between adjacent carrier elements.

Figure 13:
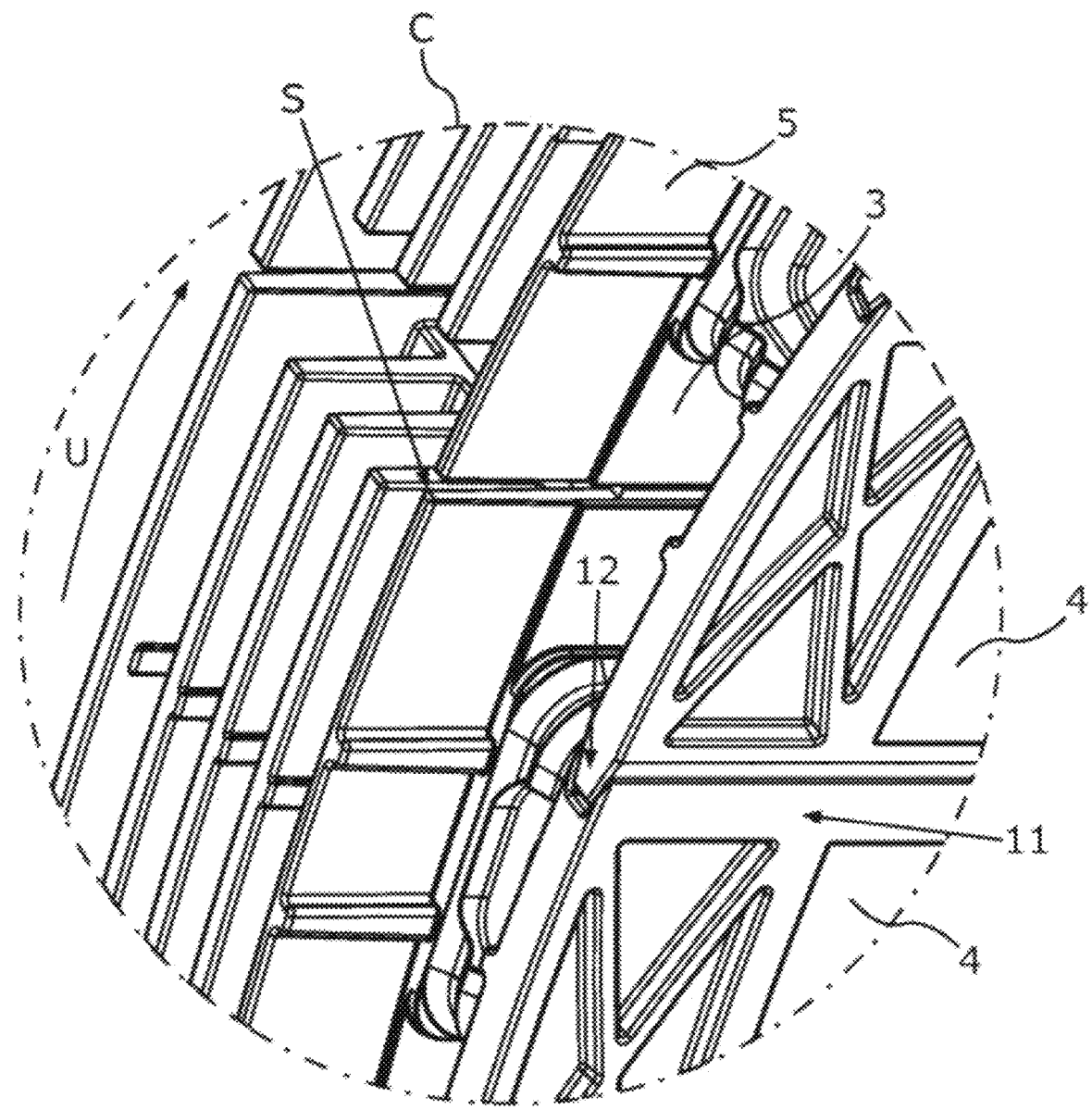
FIG. 13 shows a schematic illustration of a detail, illustrated on an enlarged scale, of the ring from FIG. 12.

FIG. 13 illustrates, on an enlarged scale, an emphasized detail C of the active part 22, which detail is framed by a circle in FIG. 12. The enlarged illustration shows how the second outer edge 12 of the second frame element 4, which has a rounded shape, engages into the receiving profile 19 of the second frame element 4 which is adjacent in the circumferential direction u. Due to the receiving profile 19 of an outer edge of the second frame element 4 and also due to the corresponding shape of the opposite outer edge, the pole tooth modules 6 or the insulation bodies 1 of the respective pole tooth modules 6 may be clipped or placed one into the other so as to form a seal.

It can further be gathered from FIG. 13 that the carrier element 5 and the outer edges of the first frame element 3 which extend in the main direction of extension x are arranged at a distance in relation to one another in the circumferential direction u. In other words, a gap S is formed between adjacent carrier element 5 and the outer edges of the first frame element 3.

FIG. 14 shows the electric machine 25 including the active part 22 and a housing 26. Like the electric machine 25 shown in FIG. 5, the housing 26 encompasses the active part in the case of the electric machine 25 shown in FIG. 14. The housing 26 further has a passage opening 27 for receiving or leading-through a shaft, not illustrated, of the electric machine 25. The active part 22 is fitted into the housing 26 with a press fit.

FIG. 15 shows a plan view of the electric machine from FIG. 14. FIG. 15 further shows how the coil of each pole tooth module 6 is connected to a corresponding switching ring element. In this case, the switching ring elements are designed as annular busbars. In this case, the respective busbars may be formed from segments. For example, a busbar may be formed from two semicircular segments or from one segment in the form of a full circle. The switching ring elements are further matched to a radius in the region of the receiving region of the carrier element. For the purpose of connecting the coil to a corresponding switching ring element, a wire of each coil of each pole tooth module 6 extends from the central piece 2 to the carrier element 5 or to the corresponding switching ring element in one of the receiving regions of the carrier element 5.

Figure 16:
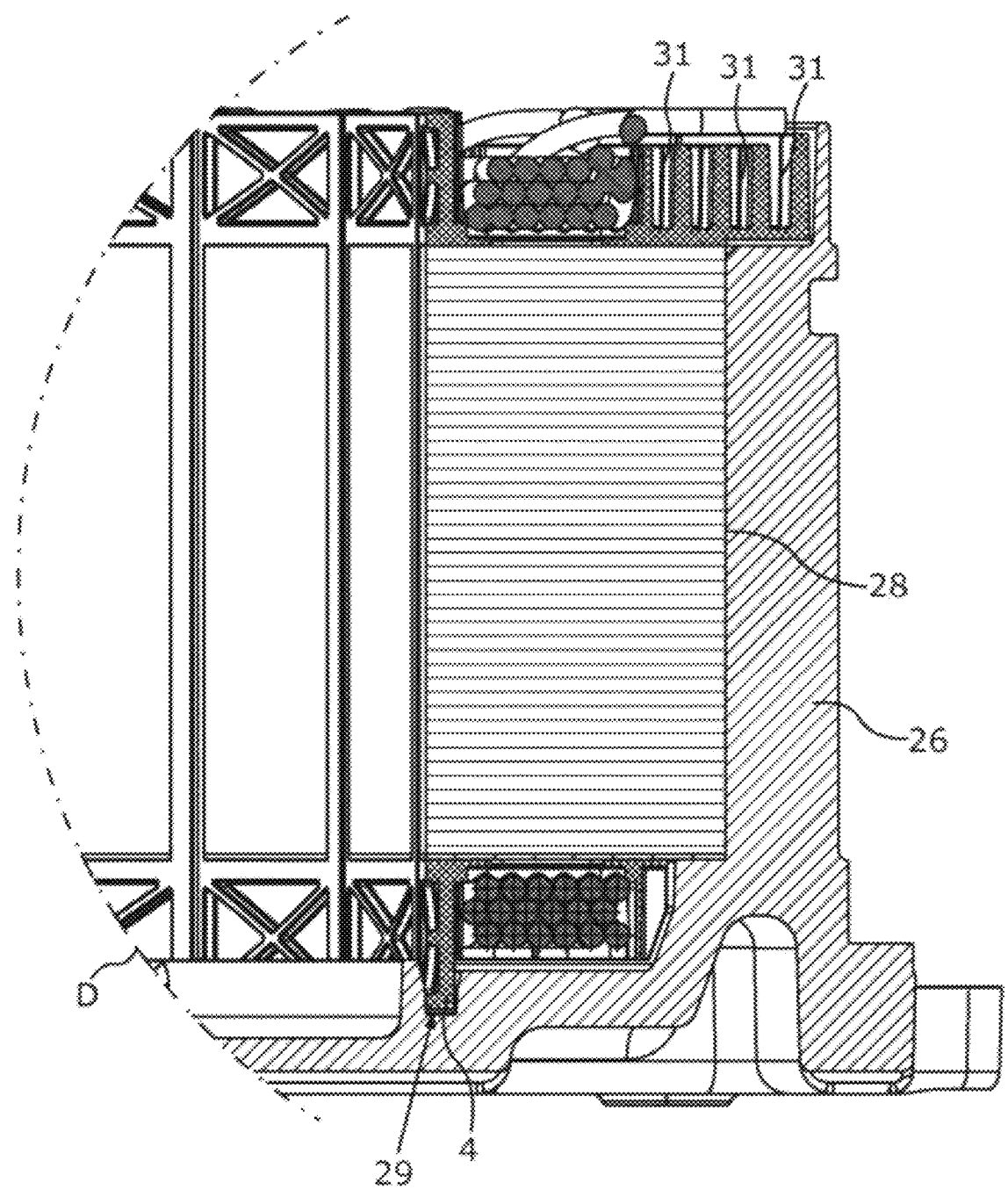
FIG. 16 shows, in a sectional illustration, a schematic illustration of a detail, illustrated on an enlarged scale, of the electric machine from FIG. 14.

FIG. 16 illustrates, on an enlarged scale, an emphasized detail D of the electric machine 25, which detail is framed by a circle in FIG. 14. The enlarged illustration shows how the active part 22, as has already been described in connection with FIG. 6, by way of its individual pole tooth modules 6, is enclosed into the housing 26. In this case, an inner surface 28 of the housing 26 bears directly against the pole tooth 7, for example, the pole heads 9. Furthermore, a circumferential groove 29, in which the second frame element 4 is received in regions, is provided on the inner side 28 or inner surface of the housing 26. It is likewise clear from FIG. 16 that the coil 30, which is electrically connected to one of the switching ring elements 31, is wound around the central piece 2 of the insulation body 1.

Figure 17:
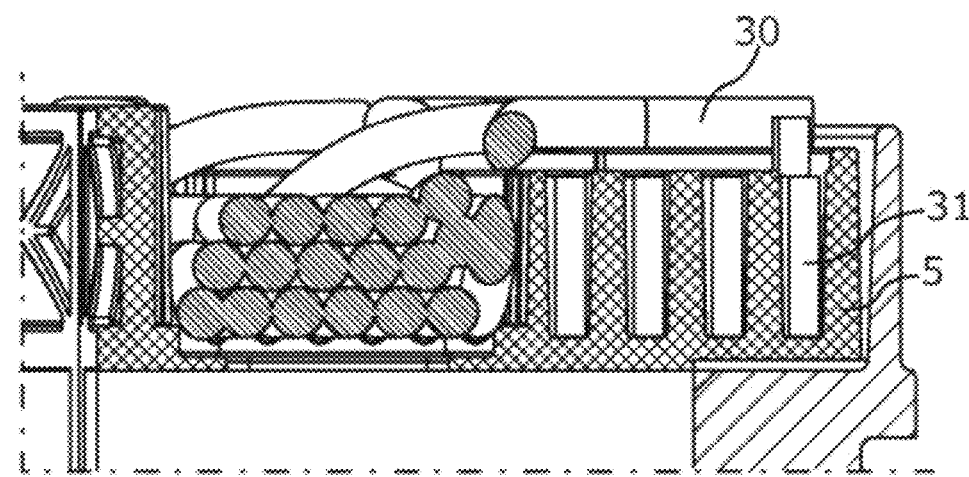
FIG. 17 shows, in a perspective view, a schematic illustration of the detail, illustrated on an enlarged scale, of the electric machine from FIG. 14.

FIG. 17 shows a further enlarged illustration of the region D. FIG. 17 shows how a switching ring element 31 is electrically connected or coupled to a wire of the coil 30. In this case, the wire of the coil 30, which wire is to be connected to one switching ring element 31 of the four switching ring elements 31, is guided from the region of the central piece 2 to the carrier element 5.

Figure 18:
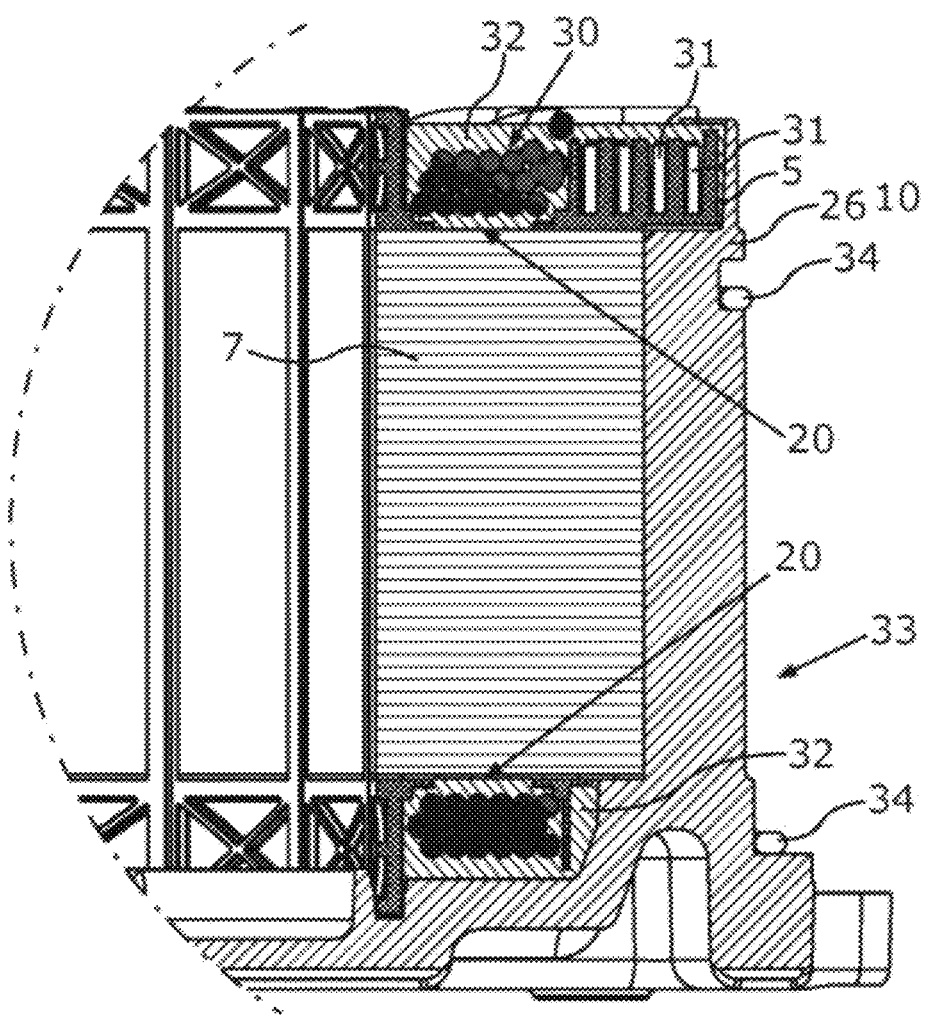
FIG. 18 shows, in a further perspective view, a schematic illustration of the detail, illustrated on an enlarged scale, of the electric machine from FIG. 14.

In FIG. 18, the coils 30 and the insulation body 1 are encapsulated with an encapsulation compound 32. The encapsulation compound 32 sheaths the coil 30, the carrier element 5, also in the region in which the carrier element 5 adjoins the housing 26, and the switching ring elements 31. In addition, the encapsulation compound 31 fills up the openings 20. In this way, the encapsulation compound 30 makes contact with the laminated core or the pole tooth 7 in the region of the openings 20. On an outer side 33 of the housing 26, which outer side is averted from the pole teeth 7 or the laminated core of the active part 22, a further housing wall of the housing 26 may be arranged at a predetermined distance in relation to the housing wall which receives the active part 22. As a result, a cooling duct can be formed, for example, on a surface of the housing 26, which surface is opposite in the region of the pole tooth. FIG. 18 shows two O-rings 34 which are arranged at a predetermined distance in relation to one another on the internal housing wall of the housing 26 in the main direction of extension x. The O-rings 34 are annular sealing elements which encompass the inner wall of the housing 26 in the circumferential direction u. A duct in which a cooling fluid circulates during operation of the electric machine is formed between the O-rings. In this way, the electric machine 25, e.g., the active part 22 of the electric machine 25, may be cooled by jacket cooling.

Figure 19:
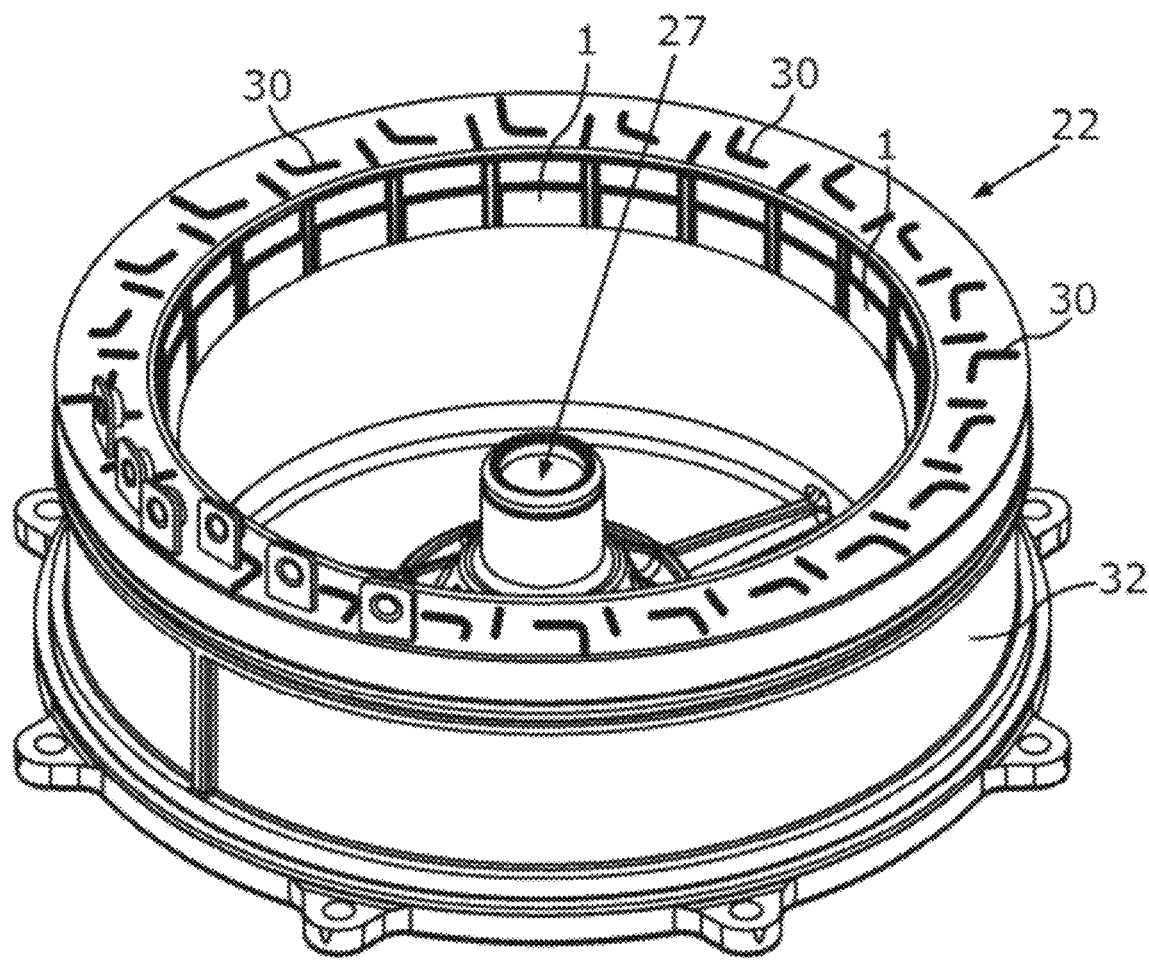
FIG. 19 shows a schematic illustration of the active part including an encapsulation compound.

FIG. 19 shows the active part 22 which is encapsulated or encompassed by the encapsulation compound 32. Amongst other things, the encapsulation compound also fills in or fills up the gaps S shown in FIG. 12 and FIG. 13. As a result, the encapsulation compound 32 forms a closed encapsulation compound.

The individual steps for producing the electric machine 25 will be discussed further below. In a first method step, the individual pole teeth 7, as single pole teeth, are provided and encapsulated by injection molding with a plastic for forming the insulation body 1, as already described in connection with FIG. 1 and FIG. 2. The coil 30 is then wound around the central piece 2 of the insulation body 1. In a subsequent method step, the individual pole tooth modules 6 are arranged beside one another to form a closed ring. In a further method step, the active part 22, which includes the pole tooth modules 6 and the switching ring elements 31, is pressed into the housing 26 with a press fit. The switching ring elements 31, which are likewise configured in an annular manner, are then inserted into the receiving regions 21 of the carrier elements 5. In a last method step, the active part 22, for example, the pole tooth modules 6 and also the switching ring elements 31, is encapsulated with an encapsulation compound. The encapsulation compound sheaths the wires of the coil 30, the free surfaces of the pole teeth 7, the switching ring elements 31 and fills up the openings 20 of the insulation body 1. In this case, the active part 22 may be encapsulated with the encapsulation compound in such a way that spacings in relation to the housing 26 are closed. A direct thermal connection of the coils 30 and/or of the switching ring elements 31 to the pole tooth 7 or the laminated core and also the housing 26 is realized by the encapsulation compound through the openings 20 in the insulation body 1. The encapsulation compound thermally connects the winding heads of the coils and/or the carrier elements 5 with the inserted busbars or switching ring elements 31 and/or the coil former of the coils to the housing 26 and/or the laminated core which is formed by combining the pole teeth. Particularly good removal of heat from the coils 30 and/or from the busbars or from the switching ring elements 31 takes place by way of the encapsulation compound. The electric machine is configured in a thermally optimized manner owing to the encapsulation compound. In addition, the number of thermal bridges within the electric machine is reduced due to the thermal connection.

Overall, the example shows how a system for electrically insulating and fixing coils and busbars while using an individual pole tooth can be provided by the disclosure.

A number of implementations have been described. Nevertheless, it will be understood that various modifications may be made without departing from the spirit and scope of the disclosure. Accordingly, other implementations are within the scope of the following claims.

What is claimed is:

1. A pole tooth module for an electric machine, the pole tooth module comprising:
a pole tooth having a pole shoe and a pole head;
a coil arranged around a circumferential surface of the pole tooth between the pole shoe and the pole head;
an insulation body enclosing the pole tooth, the insulation body electrically insulating the pole tooth from the coil which is arranged around the pole tooth, the insulation body encloses the pole tooth by way of, a central piece, a first frame element and a second frame element, wherein:
the central piece is arranged between the coil and the circumferential surface and at least partially surrounds the circumferential surface of the pole tooth, and the central piece has a plurality of openings arranged at predetermined distances in relation to one another in the circumferential direction around the circumferential surface of the pole tooth in the central piece, such that one side of the circumferential surface has at least two of the plurality of openings;
the first frame element adjoins a side of the central piece, which side faces the pole head; and
the second frame element adjoins an opposite side of the central piece, which opposite side faces the pole shoe, and encloses the pole shoe;
a carrier element arranged on the first frame element such that the carrier element extends along a side of the pole head.

2. The pole tooth module of claim 1, wherein the first frame element and/or the second frame element have/has at least two outer edges which extend in a main direction of extension of the pole tooth, wherein:
a first outer edge of the at least two outer edges has a receiving profile extending along the first outer edge, and
a second outer edge situated opposite the first outer edge has a shape corresponding to the receiving profile.

3. The pole tooth module of claim 2, wherein the receiving profile is a groove.

4. The pole tooth module of claim 1, wherein:
the carrier element holds at least one switching ring element of the electric machine, and
the carrier element has at least one receiving region in which the at least one switching ring element is arranged.

5. An active part for an electric machine comprising a pole tooth module, the pole tooth module comprising:
a pole tooth having a pole shoe and a pole head;
a coil arranged around a circumferential surface of the pole tooth between the pole shoe and the pole head;
an insulation body enclosing the pole tooth, the insulation body electrically insulating the pole tooth from the coil which is arranged around the pole tooth, the insulation body encloses the pole tooth by way of, a central piece, a first frame element and a second frame element, wherein:
the central piece is arranged between the coil and the circumferential surface and at least partially surrounds the circumferential surface of the pole tooth, and the central piece has a plurality of openings arranged at predetermined distances in relation to one another in the circumferential direction around the circumferential surface of the pole tooth in the central piece, such that one side of the circumferential surface has at least two of the plurality of openings;

the first frame element adjoins a side of the central piece, which side faces the pole head; and the second frame element adjoins an opposite side of the central piece, which opposite side faces the pole shoe, and encloses the pole shoe;

a carrier element arranged on the first frame element such that the carrier element extends along a side of the pole head.

6. The active part of claim 5, wherein the active part is designed as a stator or a rotor.

7. The active part of claim 5, further comprising a plurality of pole tooth modules arranged beside one another in a ring in a circumferential direction of the active part in such a way that the first frame element of one pole tooth module is arranged on the first frame element of the pole tooth module which is adjacent in the circumferential direction, and the second frame element of the pole tooth module is arranged on the second frame element of the pole tooth module which is adjacent in the circumferential direction.

8. The active part of claim 5, wherein respective outer edges of the first frame elements of adjacent pole tooth modules and/or of the second frame elements of adjacent pole tooth modules interengage by way of the mutually corresponding shape of the outer edges.

9. The active part of claim 5, further comprising a plurality of carrier elements, wherein the pole tooth modules are arranged beside one another in such a way that the plurality of carrier elements of the insulation body are arranged adjoining one another in the circumferential direction.

10. An electric machine comprising an active part, the active part comprising a pole tooth module, the pole tooth module comprising:

a pole tooth having a pole shoe and a pole head;

a coil arranged around a circumferential surface of the pole tooth between the pole shoe and the pole head;

an insulation body enclosing the pole tooth, the insulation body electrically insulating the pole tooth from the coil which is arranged around the pole tooth, the insulation body encloses the pole tooth by way of, a central piece, a first frame element and a second frame element, wherein:

the central piece is arranged between the coil and the circumferential surface and at least partially surrounds the circumferential surface of the pole tooth, and the central piece has a plurality of openings arranged at predetermined distances in relation to one another in the circumferential direction around the circumferential surface of the pole tooth in the central piece, such that one side of the circumferential surface has at least two of the plurality of openings;

the first frame element adjoins a side of the central piece, which side faces the pole head; and the second frame element adjoins an opposite side of the central piece, which opposite side faces the pole shoe, and encloses the pole shoe;

a carrier element arranged on the first frame element such that the carrier element extends along a side of the pole head.

11. The electric machine of claim 10, further comprising a housing surrounding the active part in such a way that an inner side of the housing adjoins the second frame element, the housing having a circumferential groove on the inner side, the second frame element being received in the circumferential groove in regions.

12. The electric machine of claim 10, further comprising an encapsulation compound surrounding the active part at least in regions.

* * * * *